US009383478B2

(12) United States Patent
Miller

(10) Patent No.: US 9,383,478 B2
(45) Date of Patent: Jul. 5, 2016

(54) SYSTEM AND METHOD FOR ATMOSPHERIC PARAMETER ENHANCEMENT

(71) Applicant: Steven D. Miller, Fort Collins, CO (US)

(72) Inventor: Steven D. Miller, Fort Collins, CO (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 236 days.

(21) Appl. No.: 14/150,467

(22) Filed: Jan. 8, 2014

(65) Prior Publication Data

US 2014/0212061 A1 Jul. 31, 2014

Related U.S. Application Data

(60) Provisional application No. 61/756,555, filed on Jan. 25, 2013.

(51) Int. Cl.
*G06K 9/44* (2006.01)
*G01W 1/18* (2006.01)
*G06T 5/00* (2006.01)
*G01W 1/00* (2006.01)

(52) U.S. Cl.
CPC . *G01W 1/18* (2013.01); *G01W 1/00* (2013.01); *G06T 5/002* (2013.01); *G06T 2207/10032* (2013.01); *G06T 2207/30192* (2013.01)

(58) Field of Classification Search
CPC .......... G01W 1/00; G01W 1/18; G06T 5/002; G06T 2207/10032; G06T 2207/30192
USPC ............... 250/226, 266; 702/3, 178; 348/144; 382/264, 260
See application file for complete search history.

(56) References Cited

U.S. PATENT DOCUMENTS

| 5,612,901 | A | * | 3/1997 | Gallegos | G06K 9/0063 348/144 |
| 6,462,768 | B1 | | 10/2002 | Oakley | |
| 7,242,803 | B2 | | 7/2007 | Miller | |
| 7,379,592 | B2 | * | 5/2008 | Miller | G01W 1/00 250/226 |

(Continued)

FOREIGN PATENT DOCUMENTS

EP 0892286 1/1999
KR 20100110783 10/2010

OTHER PUBLICATIONS

Stowe, L. L., Davis, P.A., and McClain, E.P., Scientific Basis and Initial Evaluation of the CLAVR-1 Global Clear/ Cloud Classification Algorithm for the Advanced Very High Resolution Radiometer, Journal of Atmospheric and Oceanic Technology, vol. 16, pp. 656-681, Jun. 1999.*

(Continued)

*Primary Examiner* — Mekonen Bekele
(74) *Attorney, Agent, or Firm* — US Naval Research Laboratory; Scott G. Bell

(57) ABSTRACT

System and method for enhancing at least one atmospheric parameter of interest provided in remotely-sensed data by detecting and suppressing false alarm data, including computer code to receive measurement data and background including false alarms, computer code to conduct detection tests for the atmospheric parameter, computer code to compute the strength of the tests, and computer code to weight the measurement data based on the strengths and enhance the measurement data based on the weighted data.

13 Claims, 12 Drawing Sheets
(5 of 12 Drawing Sheet(s) Filed in Color)

(56) References Cited

U.S. PATENT DOCUMENTS

| | | | |
|---|---|---|---|
| 2002/0193971 A1 | 12/2002 | Whitsitt et al. | |
| 2004/0047492 A1* | 3/2004 | Muise | G06K 9/3241 382/103 |
| 2004/0153284 A1* | 8/2004 | Bernstein | G01J 3/28 702/178 |
| 2005/0012035 A1* | 1/2005 | Miller | G01W 1/00 250/226 |
| 2007/0118290 A1* | 5/2007 | Bieringer | G01S 7/415 702/3 |
| 2011/0004511 A1 | 1/2011 | Reich | |
| 2012/0213436 A1 | 8/2012 | Grindstaff et al. | |
| 2012/0263393 A1* | 10/2012 | Yahil | G06T 5/002 382/264 |
| 2013/0314694 A1* | 11/2013 | Tchoryk, Jr. | G01S 17/95 356/28.5 |

OTHER PUBLICATIONS

U.S. Appl. No. 61/756,555, Steven D. Miller, System and Method for Atmospheric Parameter Enhancement, filed Jan. 25, 2013.

Deng, G., Cahill, L.W., and Tobin, G.R., The Study of Logarithmic Image Processing Model and Its Application to Image Enhancement, IEEE Transactions on Image Processing, vol. 4, No. 4, pp. 506-512, Apr. 1995.

Lee, J.-S., Digital Image Enhancement and Noise Filtering by Use of Local Statistics, IEEE Transactions on Pattern Analysis and Machine Intelligence, vol. PAMI-2, No. 2, pp. 165-168, Mar. 1980.

Legrand, M., Plana-Fattori, A., and N'Doume, C., Satellite Detection of Dust Using the IR Imagery of Meteosat 1. Infrared Difference Dust Index, Journal of Geophysical Research, vol. 106, No. D16, pp. 18,251-18,274, Aug. 27, 2001.

Seemann, S.W., Borbas, E.E., Knuteson, R. O., Stephenson, G. R., and Huang, H-L, Development of a Global Infrared Land Surface Emissivity Database for Application to Clear Sky Sounding Retrievals from Multispectral Satellite Radiance Measurements, Journal of Applied Meteorology and Climatology, vol. 47, pp. 108-123, Jan. 2008.

Stowe, L. L., Davis, P.A., and McClain, E.P., Scientific Basis and Initial Evaluation of the CLAVR-1 Global Clear/Cloud Classification Algorithm for the Advanced Very High Resolution Radiometer, Journal of Atmospheric and Oceanic Technology, vol. 16, pp. 656-681, Jun. 1999.

* cited by examiner

SYSTEM AND METHOD FOR ATMOSPHERIC PARAMETER ENHANCEMENT

CROSS-REFERENCE TO RELATED APPLICATIONS

This application claims the benefit of priority based on U.S. Provisional Patent Application No. 61/756,555 filed on Jan. 25, 2013, the entirety of which is hereby incorporated by reference into the present application.

BACKGROUND

Methods and systems disclosed herein relate generally to image enhancement and in particular to the enhancement of atmospheric data within images. As the earth science community matures in its pursuit of interdisciplinary research, there is a growing appreciation for the importance of mineral dust and other atmospheric and meteorological parameters such as, but not limited to, fog and volcanic ash, to a myriad components of the earth/atmosphere system. For example, lofted dust can impact i) the radiation balance in the atmosphere via both direct reflective/insulation processes and indirect cloud-altering processes, ii) surface hydrology via snow/ice albedo depression and increased melting rates, and iii) the oceanic ecosystem via deposition of iron-rich nutrients that stimulate phytoplankton growth. To everyday life, atmospheric dust plays a significant role in defining air quality, contributing to human respiratory health problems and degraded atmospheric visibility, a particular concern for aviation. In a changing climate system, traditional source regions for atmospheric dust may evolve with the advance of deserts in some areas and perhaps the vegetative binding of erodible surfaces in other areas. Given the integrated role of dust and other atmospheric parameters in earth system processes, the potential climate response must be considered holistically, via fully coupled earth system models that include these parameters as active, prognostic variables. Accomplishing this physical coupling is a grand challenge and exciting frontier of modern science.

Critical to the understanding of atmospheric and meteorological processes at local, regional, and teleconnected global scales is an observing system capable of resolving the spatio/temporal variability of these processes globally. These data can be collected by a satellite platform, the constellation of which includes optical-spectrum radiometers capable of detecting and quantifying the properties of atmospheric parameters, for example, but not limited to, dust. A sensor that can offer a diversity of spectral information operates on low-earth-orbiting satellites (LEO), providing an improvement over geostationary (GEO) satellites. However, the GEO platform continues to improve as next-generation radiometers join its ranks. The first among them, the EUMETSAT Meteosat Second Generation (MSG), has introduced to GEO new spectral bands that are very useful in dust detection.

Current methods of detecting dust include NASA's Total Ozone Mapping Spectrometer (TOMS) aerosol index, blue light normalized difference dust index (NDDI), thermal infrared split window tri-spectra that enhances the emissivity of dust at different wavelengths, optical remote sensing technology Light Detection And Ranging (LIDAR) which provides a profile of the atmosphere and can detect optically thin parameters like dust. All current techniques have limitations and uncertainties, including, but not limited to, high false alarm rates Current atmospheric correction systems include models that use a background (averaged) image as their reference point and attempt to get rid of the atmospheric signal so that a better view of the surface can be achieved. However, what is needed for parameter enhancement is minimization of the contribution from the surface. In the prior art, a reference background is used to determine (via a model) a correction parameter which is applied to correct for atmospheric contamination at each location. An implicit assumption is that the aerosol properties of the atmosphere never change (purely molecular scatter), and that the change in scene brightness is therefore purely a function of the height of the observer. At least one drawback is that the prior art requires knowledge of distance from the viewer to each location of terrain. Further, the prior art does not account for atmospheric scatter which is a function of the sun and viewer geometry.

What is needed to work with new satellite platforms is a new, multi-spectral satellite algorithm that utilizes ancillary surface data to overcome traditional challenges to the detection of atmospheric parameters, for example, but not limited to, dust over barren land surfaces. Specifically, what is needed is an approach that incorporates a surface emissivity database, derived for different surface types, as a means for suppressing the erroneous enhancement of land surface features while retaining the ability to detect the atmospheric parameter above these surfaces. The approach should be applicable to both day and nighttime conditions, over land and water, and should use of an optimal combination of spectral information for each of day and night conditions, and a blend of the two across the terminator for near-seamless transition. The approach should provide a quantitative measurement as a confidence factor $[0,1]$ that can be used for visualization as well, presented in the context of the meteorological situation responsible for the atmospheric parameter's presence and movement. The approach should be useful to both automated processes and human users alike. What is further needed is a system that includes multiple parameter detection tests, each having a spatially-resolved background value. What is further needed is the use of the background to determine the strength of contribution from the test that it corresponds to, and combining the results of the individual scores from the tests in a weighted way to form an overall 'score', upon which enhanced imagery can be based.

SUMMARY

The system and method of the present embodiment provide dynamic enhancement of meteorological parameters wherein, at each location, the scaling is determined locally, based on a clear-sky background database. This system and method can apply to, for example, but not limited to, dust, volcanic ash, and low-clouds/fog. Dust can include mineral dust that is typically smaller than sand, less than ten microns in diameter. The system and method of the present embodiment can be used to, for example, but not limited to, examine the earth's thermal energy budget and to assess a hurricane's development potential. The system and method of the present embodiment can, for example, but not limited to, mitigate health impacts and attenuation of optical systems through assessment of atmospheric visibility, mitigate the impact of algae blooms by providing water clarity assessments, and mitigate the impacts of melting ice by providing dust deposition assessments. The method of the present embodiment for creating enhanced imagery derived from remotely-sensed data for at least one atmospheric parameter can include, but is not limited to, the steps of (a) conducting multiple detection tests of the remotely-sensed data for the at least one atmospheric parameter, each of the tests having a spatially resolved background value, each of the tests having a result, (b) computing the strength of contribution of each of the tests based on the background value corresponding to each of the tests and the results, (c) weighting the results based on the strengths, and (d) creating enhanced imagery for the at least one atmospheric parameter based on the combined weighted results. Optionally, the method can include the steps of filtering clouds from the remotely-sensed data, and executing steps (a)-(d) based on the filtered remotely-sensed data.

In another embodiment, a computer-based method for enhancing at least one atmospheric parameter of interest provided in remotely-sensed data by detecting and suppressing false alarm data can include, but is not limited to including, the steps of automatically receiving measurement data for the atmospheric parameter of interest in a scene, the measurement data including false alarm data, automatically compiling, from a number of observations, background BG data at each location in the scene, the BG data including the false alarm data, automatically selecting the measurement data to enhance, the selected measurement data each having a value greater than the value of the BG corresponding to the measurement data at each of the locations, and automatically enhancing the selected measurement data at each of the locations by scaling the measurement data, the scaling bounds being dynamically defined based on the locations and the BG corresponding to each of the locations. The method can optionally include the steps of presenting the enhanced measurement data as imagery, providing the enhanced measurement data as digital data, and determining a quantitative confidence measure of the enhanced measurement data at each of the locations based on the digital values of the enhanced measurement data at each of the locations.

With respect to dust, in particular, the method of the present embodiment can incorporate a multi-spectral satellite algorithm that can utilize ancillary surface emissivity and/or cloud-cleared temperature information to mitigate traditional challenges in dust detection over barren land surfaces. The method of the present embodiment can better discern atmospheric parameters from areas with a similar spectral signature by using historic imagery of regions in which the atmospheric parameter was low or non-existent. The dust method can incorporate a surface emissivity database such as, for example, but not limited to, the University of Wisconsin Cooperative Institute for Meteorological Satellite Studies (UW/CIMSS) Baseline Fit, derived from data from a key instrument, Moderate Resolution imaging Spectroradiometer (MODIS) aboard the Terra (EOS AM) and Aqua (EOS PM) satellites, and high resolution laboratory spectra for different surface types, as a means to suppress the erroneous enhancement of land surface features while retaining the ability to detect dust above these surfaces. The method can use the surface emissivity database to estimate what the clear-sky measurement values would be for pre-selected dust detection tests at each pixel, and can use these estimates as the base scaling bound so as to reduce 'false alarms' that can arise from certain surface types that produce a signal that can be mistaken for lofted dust. The method is applicable to both day and nighttime conditions, over land and water, and can use an optimal combination of spectral information for each condition and a blend of the two across the day/night terminator for a near-seamless transition. The method can compute a detection quantitatively as a confidence factor [0,1], and can produce imagery, presented in the context of the meteorological situation responsible for the dust lofting. In this way, the method can be used by automated processes and human users. Compared to existing red/green/blue (RGB) enhancements, the method of the present embodiment can provide a more isolated view of the dust while preserving the native spatial resolution of the satellite sensor. Also, unlike current dust imagery, the method of the present embodiment produces pseudo-quantitative data, and can be used as a thresholded dust mask.

In yet another embodiment, a computer-based method for enhancing at least one atmospheric parameter from remotely sensed data in a scene can include, but is not limited to including, the steps of computing a first observationally-based detection test TE1 based on the remotely-sensed data at a location, normalizing the TE1, the TE1 being scaled based on (a) a first background test BT1 computed at the location, and (b) a first pre-selected upper bound, computing a second observationally-based detection test TE2 based on the remotely-sensed data at the location, normalizing the TE2, the TE2 being based on (a) a second background test BT2 computed at the location, and (b) a second pre-selected upper bound, normalizing an atmospheric parameter AP at the location based on a first two pre-selected bounds, computing a daytime variable D based on the normalized TE1 and the normalized TE2, normalizing D based on a second two preselected bounds, computing a nighttime variable N based on the normalized TE2, the normalized AP, normalizing the N based on a third two pre-selected bounds, computing a term weighting function TW based on the solar zenith angle at the location, and computing image colors based on TW, normalized D and normalized N. The method can optionally include the steps of automatically computing a cloud mask CM based on spatial and spectral threshold tests, the CM being 0 for clear sky, 1 for cloudy, and between 0 and 1 based on confidence factors, automatically filtering the remotely-sensed data based on the CM, automatically modifying the D based on the CM, automatically modifying the N based on the CM, automatically modifying the enhancement variable based on the modified D, the modified N, and T, and enhancing imagery based on the modified enhancement variable.

These and other aspects and features of the present teachings will become apparent from the following detailed description of the exemplary embodiments, read in conjunction with, and with reference to, the accompanying drawings.

BRIEF DESCRIPTION OF THE DRAWINGS

Referring now to the drawings, in which like numerals represent like elements, aspects of the exemplary embodiments will be described in connection with the drawing set. The patent or application file contains at least one drawing executed in color. Copies of this patent or patent application publication with color drawing(s) will be provided by the Office upon request and payment of the necessary fee.

DETAILED DESCRIPTION

Figure 1:
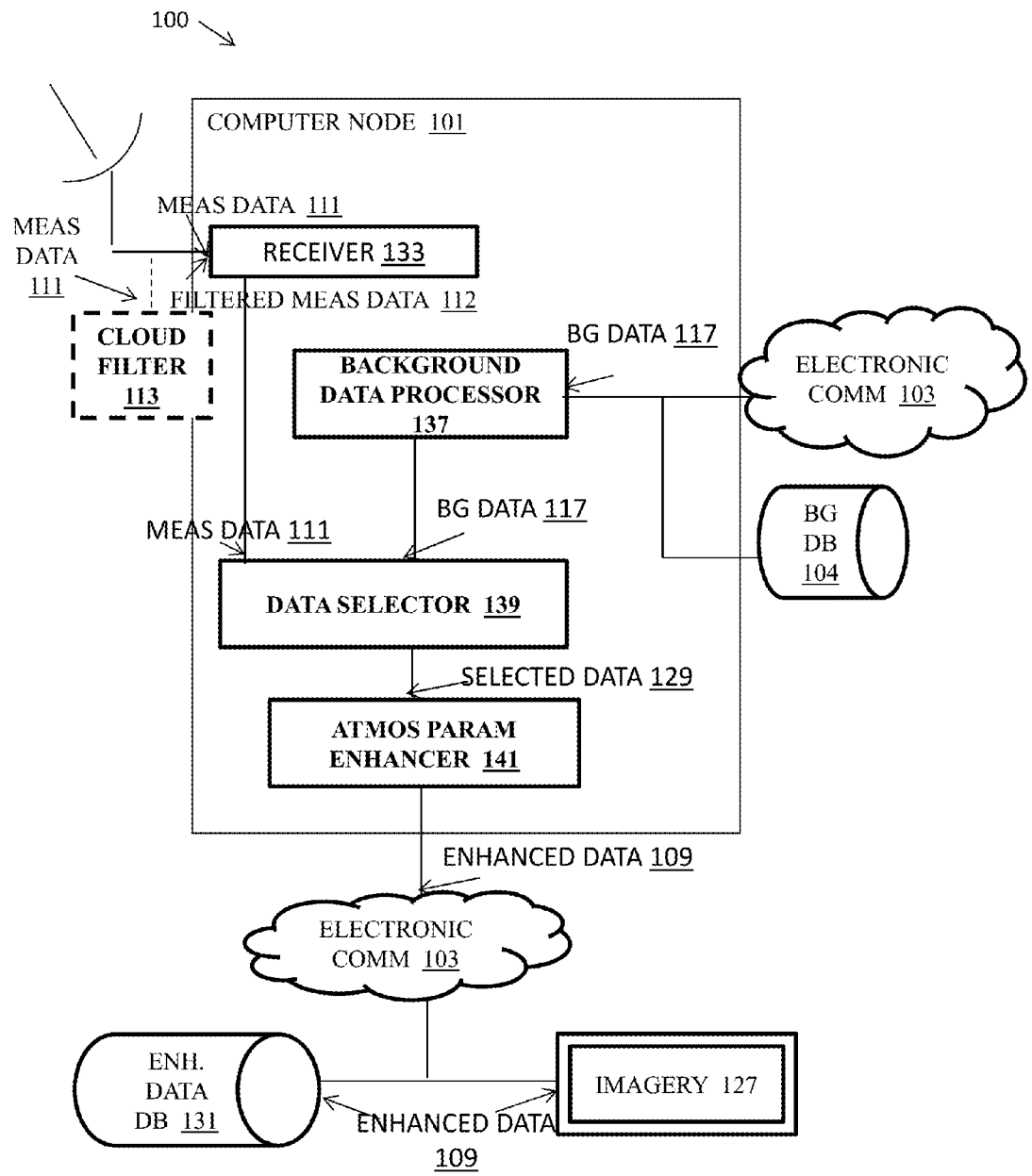
FIG. 1 is a schematic block diagram of one embodiment of the system of the present embodiment.

The problems set forth above as well as further and other problems are solved by the present teachings. These solutions and other advantages are achieved by the various embodiments of the teachings described herein below.

The system and method of the present embodiment can apply, combine, and display the results of detection tests in a way that results in the enhancement of an atmospheric parameter. The system and method are applicable to, for example, but not limited to, optical spectrum imaging radiometers. Conventional infrared data, for example, can be used to detect dust by first employing a conventional front-end cloud mask, such as for example, the process described in Stowe, L. L., P. A. Davis, and E. P. McClain, *Scientific basis and initial evaluation of the CLAVR-1 global clear/cloud classification algorithm for the advanced very high resolution radiometer, J. Atmos. Oceanic Technol.,* 16, 656-681, incorporated by reference herein in its entirety, followed by performing post-mask dust restoral tests. A clear-sky background can be used to turn off false alarms and create cloud-cleared scenes (see Legrand et al., *Satellite Detection of Dust Using the IR imagery of Meteosat, Journal of Geophysical Research,* Vol. 106, No. D16, pp. 18,251-18,274, August, 2001, and Seemann et al., *Development of a Global Infrared Land Surface Emissivity Database for Application to Clear Sky Sounding Retrievals from Multispectral Satellite Radiance Measurements, Journal of Applied Meteorology and Climatology,* Vol. 347, pp. 108-123, January, 2008, both incorporated by reference herein in their entirety). The result is dynamic scaling indexed to background values which can reduce the false alarm field. A confidence factor [0,1] output can return dust measures quantitatively, (0=no dust, 1=dust) and can allow for use of the result as a quantitative mask as well as enhanced imagery. The result can be used as a visual analysis aide because the native spatial resolution of sensor and the meteorological context of dust events are retained. Blended transition of day and night algorithms at the terminator simplifies user interpretation and training. The system and method of the present embodiment use a clear sky background application to turn off false alarms over land and to isolate the dust signal and then enhance it in a consistent way, with minimal color distractions. Cloud-cleared brightness/temperature difference (BTD) backgrounds can be built from composites for each spectral band, and can serve as the base value for scaling bounds. The method of the present embodiment can account for surface features that appear as false dust signals in conventional RGB algorithms used for dust enhancement. The method of the present embodiment can suppress false alarms caused by spectrally complex surfaces, and can enable a clearer depiction of significant dust extent with minimal loss of information. Further, daytime and nighttime can be accounted for separately, but a transition can cause a display to go from day to night with no break.

Beginning with a measurement or set of measurements that provide a basic detection capability for the atmospheric parameter of interest, which measurement combinations may also produce false alarms, features in the scene can be distinguished from portions of the surface that hold similar spectral properties to the parameter of interest. The purpose of the present teachings is to account for and suppress these false alarms. The method of the present embodiment can include the step of compiling a "background" of these measurement combinations from many observations to provide a view of the scene without the atmospheric parameter of interest, but containing the field of false alarms in the surface background. Knowledge of these locations and the strength of the false alarms can be used to reduce/eliminate them from the final enhancement. At each location, the method can further include the step of examining the measurement or set of measurements that provide the detection capability for the atmospheric parameter of interest. If the value of the measurement is greater than the background measurement, then the method can include the step of considering the value as an indication of the presence of the parameter of interest. If the value is similar to the background measurement, the method includes the step of not enhancing that location since it is likely to be produced by a false alarm. The method can further include the step of scaling the measurement between a minimum and maximum value. A standard approach would be to select a fixed value of minimum and maximum, and in this case any false alarms present in the scene would also be enhanced. In the present embodiment, the method can include the step of replacing the fixed-value minimum by the background value determined previously, such that the scaling bounds are defined dynamically (as a function of location). After the parameter of interest has been isolated by the dynamic scaling described herein, the method can include the step of presenting the parameter of interest as imagery or as digital data whose values reflect the confidence level of detection.

Referring now to FIG. 1, system 100 for enhancing at least one atmospheric parameter of interest provided in remotely-sensed data by detecting and suppressing false alarm data can include, but is not limited to including, receiver 133 automatically receiving measurement data 111 for the atmospheric parameter of interest in a scene, measurement data 111 including false alarm data. System 100 can also include background data processor 137 automatically compiling, from a number of observations, background BG data 117 at each location in the scene, BG data 117 including the false alarm data. System 100 can still further include data selector 139 automatically selecting measurement data 111 to enhance, selected measurement data 129 each having a value greater than the value of BG data 117 corresponding to measurement data 111 at each of the locations. System 100 can also include atmospheric parameter enhancer 141 automatically enhancing selected measurement data 129 at each of the locations by scaling selected measurement data 129, the scaling bounds being dynamically defined based on the locations and BG data 117 corresponding to each of the locations. System 100 can optionally include imagery display 127 presenting enhanced measurement data 109 as imagery, and enhanced data database 131 storing enhanced measurement data 109 as digital data.

Figure 2:
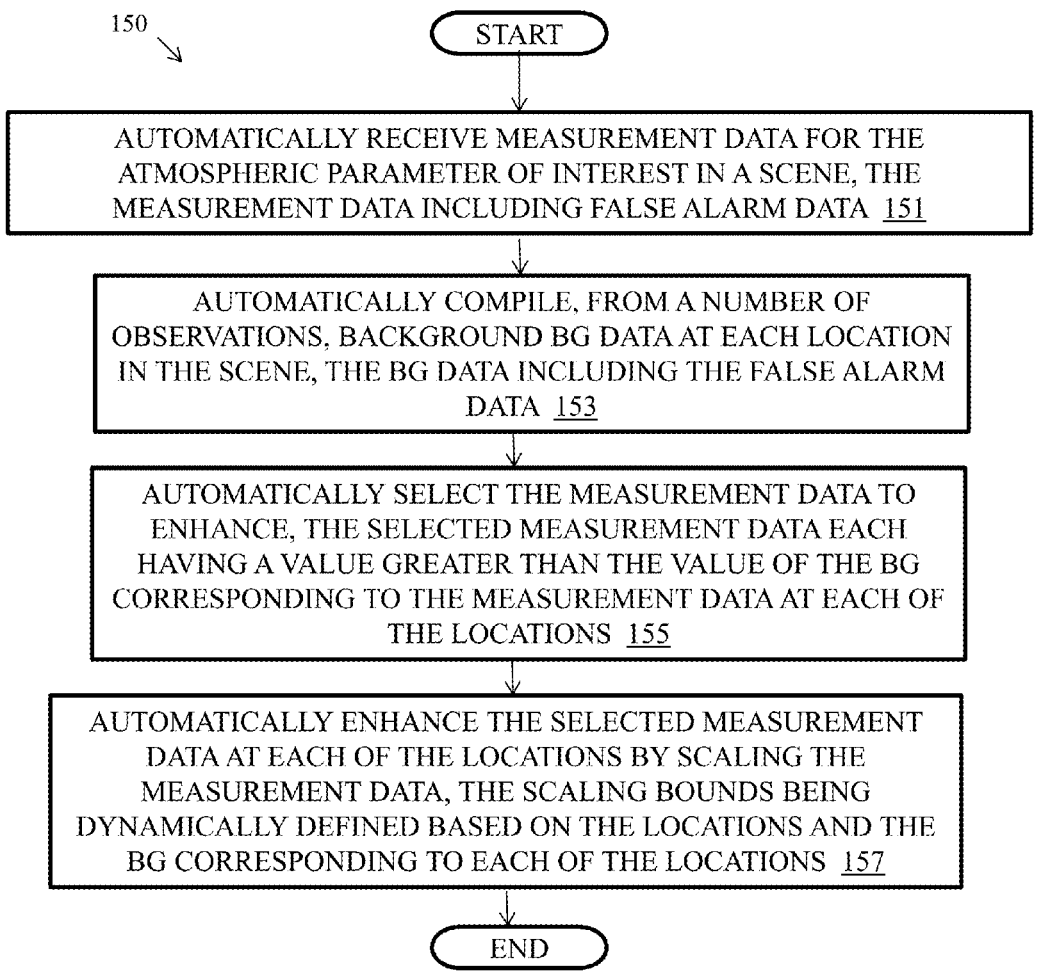
FIG. 2 is a flowchart of one embodiment of the method of the present embodiment.

Referring now to FIG. 2, method 150 for enhancing at least one atmospheric parameter of interest provided in remotely-sensed data by detecting and suppressing false alarm data can include, but is not limited to including, the steps of automatically receiving 151 measurement data for the atmospheric parameter of interest in a scene, the measurement data including false alarm data, automatically compiling 153, from a number of observations, background BG data at each location in the scene, the BG data including the false alarm data, automatically selecting 155 the measurement data to enhance, the selected measurement data each having a value greater than the value of the BG corresponding to the measurement data at each of the locations, and automatically enhancing 157 the selected measurement data at each of the locations by scaling the measurement data, the scaling bounds being dynamically defined based on the locations and the BG corresponding to each of the locations. Method 150 can optionally include the steps of presenting the enhanced measurement data as imagery, providing the enhanced measurement data as digital data, and determining a quantitative confidence measure of the enhanced measurement data at each of the locations based on the digital values of the enhanced measurement data at each of the locations.

Figure 3:
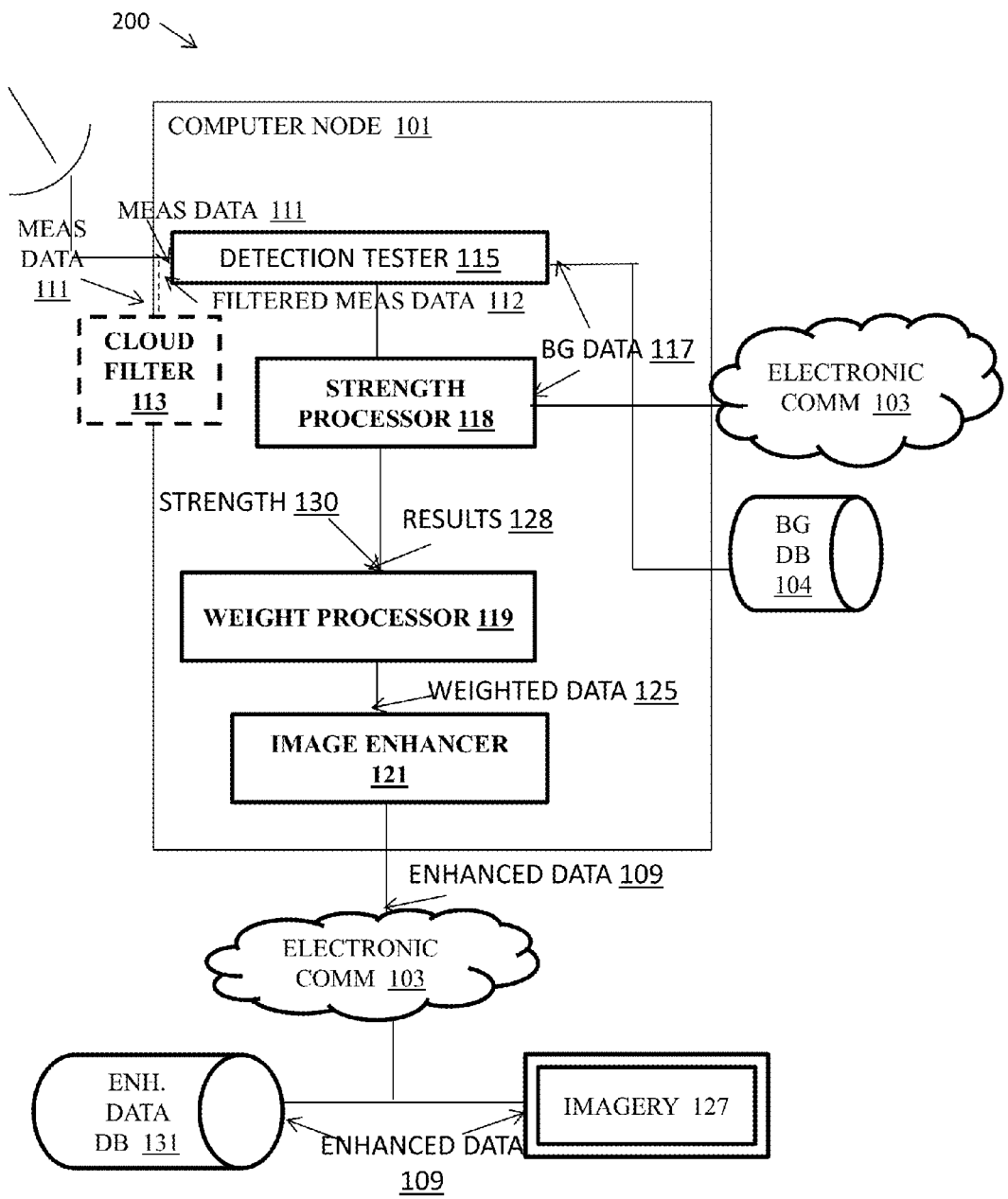
FIG. 3 is a schematic block diagram of another embodiment of the system of the present embodiment.

Referring now to FIG. 3, system 200 for creating enhanced imagery derived from remotely-sensed data for at least one atmospheric parameter can include, but is not limited to including, detection tester 115 conducting multiple detection tests of remotely-sensed data 111 for the at least one atmospheric parameter, each of the tests having a spatially resolved background value 117, each of the tests having result 128. System 200 can also include strength processor 118 computing strength 130 of contribution of each of the tests based on background value 104 corresponding to each of the tests and results 128, and weight processor 119 weighting results 104 based on strengths 130. System 200 can also include image enhancer 121 creating enhanced data 109 for the at least one atmospheric parameter based on the combined weighted results 125. System 200 can optionally include cloud filter 113 filtering clouds from the remotely-sensed data and creating filtered measured data 112.

Figure 4:
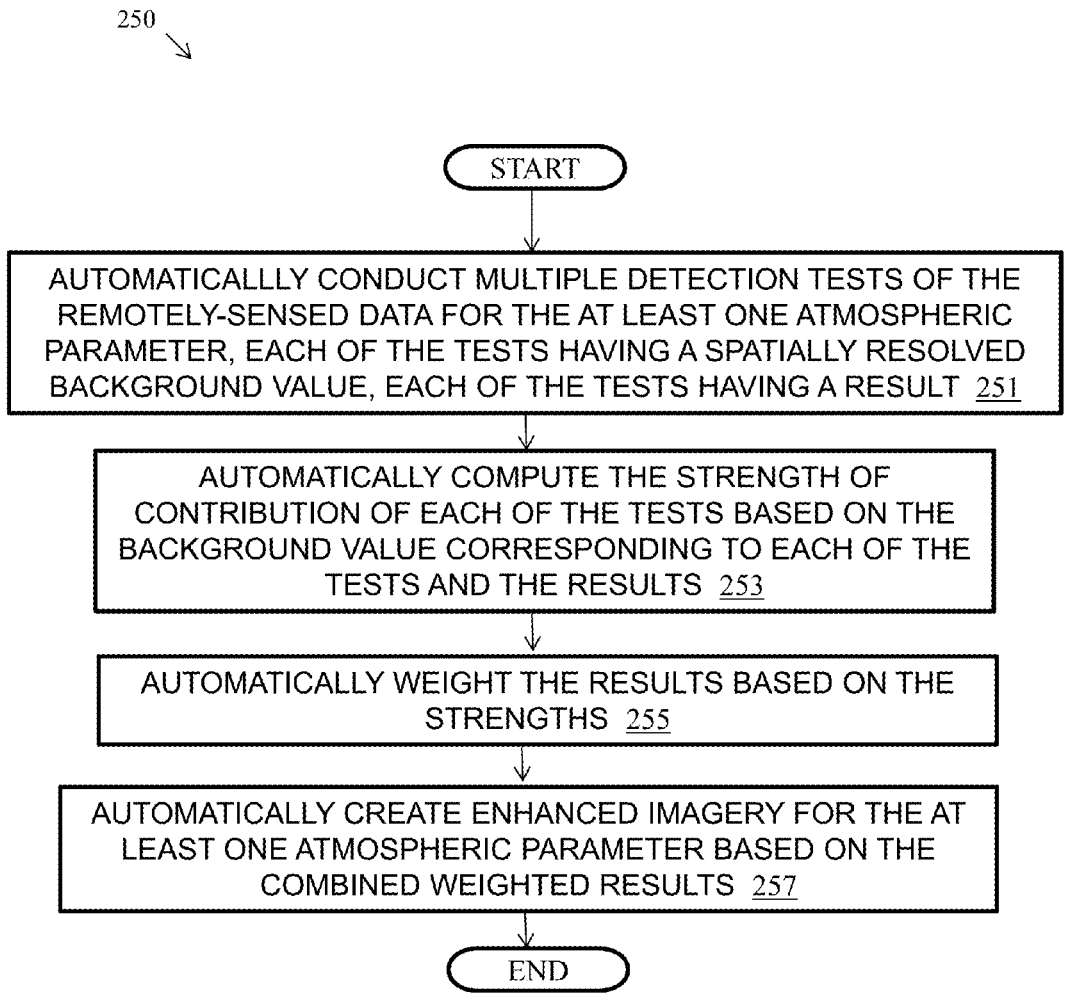
FIG. 4 is a flowchart of another embodiment of the method of the present embodiment.

Referring now to FIG. 4, method 250 for creating enhanced imagery derived from remotely-sensed data for at least one atmospheric parameter can include, but is not limited to including, the steps of (a) automatically conducting 251 multiple detection tests of the remotely-sensed data for the at least one atmospheric parameter, each of the tests having a spatially resolved background value, each of the tests having a result, (b) automatically computing 253 the strength of contribution of each of the tests based on the background value corresponding to each of the tests and the results, (c) automatically weighting 255 the results based on the strengths, and (d) automatically creating 257 enhanced imagery for the at least one atmospheric parameter based on the combined weighted results. Method 250 can optionally include the steps of filtering clouds from the remotely-sensed data, and executing steps (a)-(d) based on the filtered remotely-sensed data.

Figure 5A:
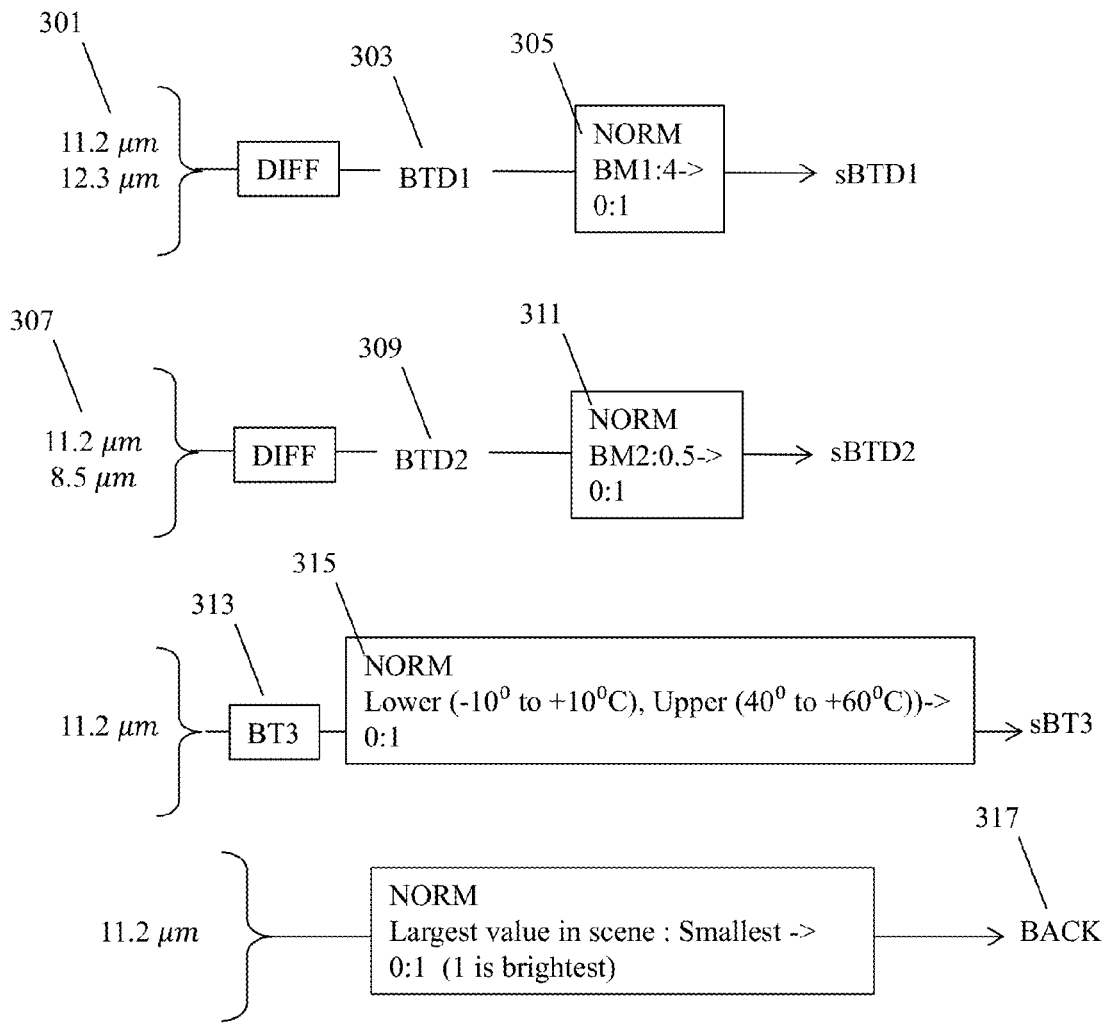
FIGS. 5A-5C are exemplary equations of the present embodiment.
Figure 5B:
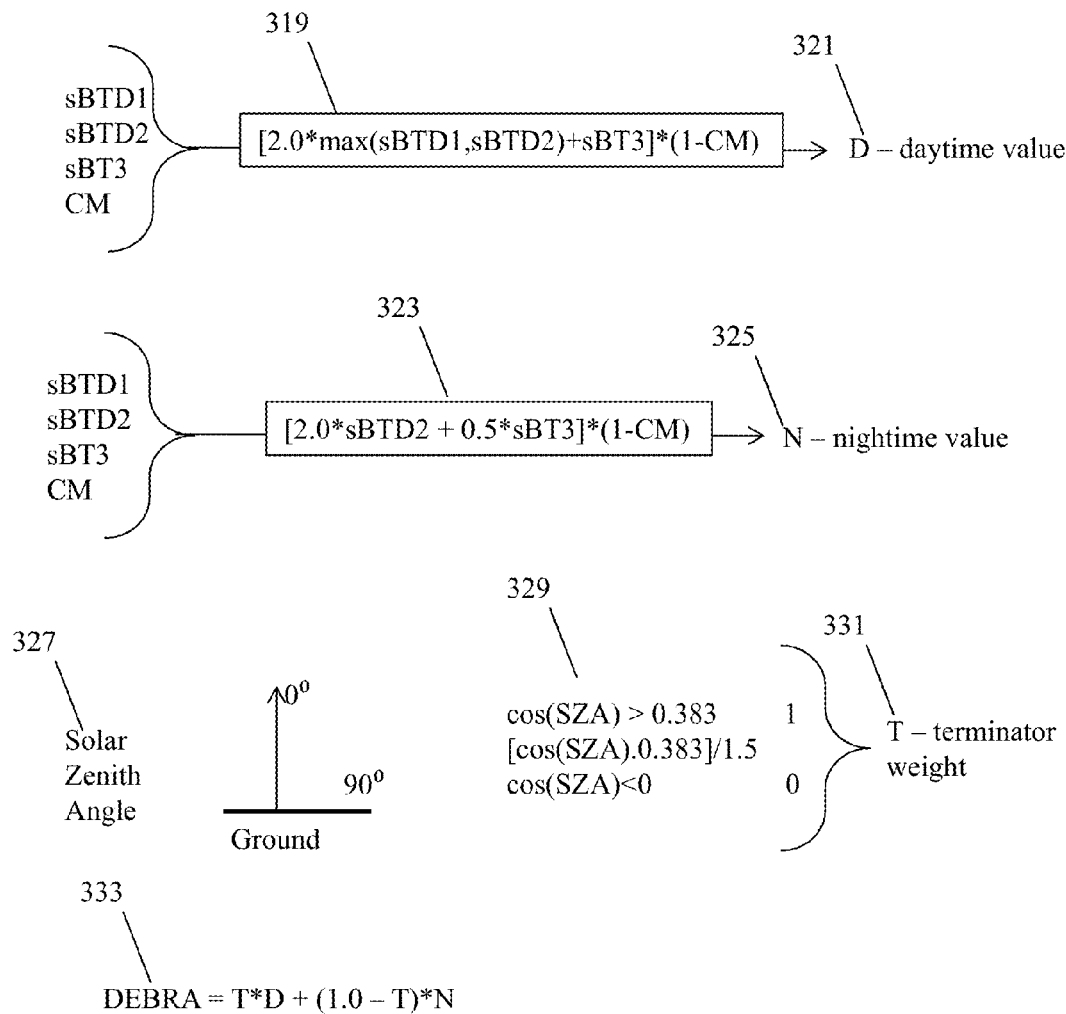
Figure 5C:
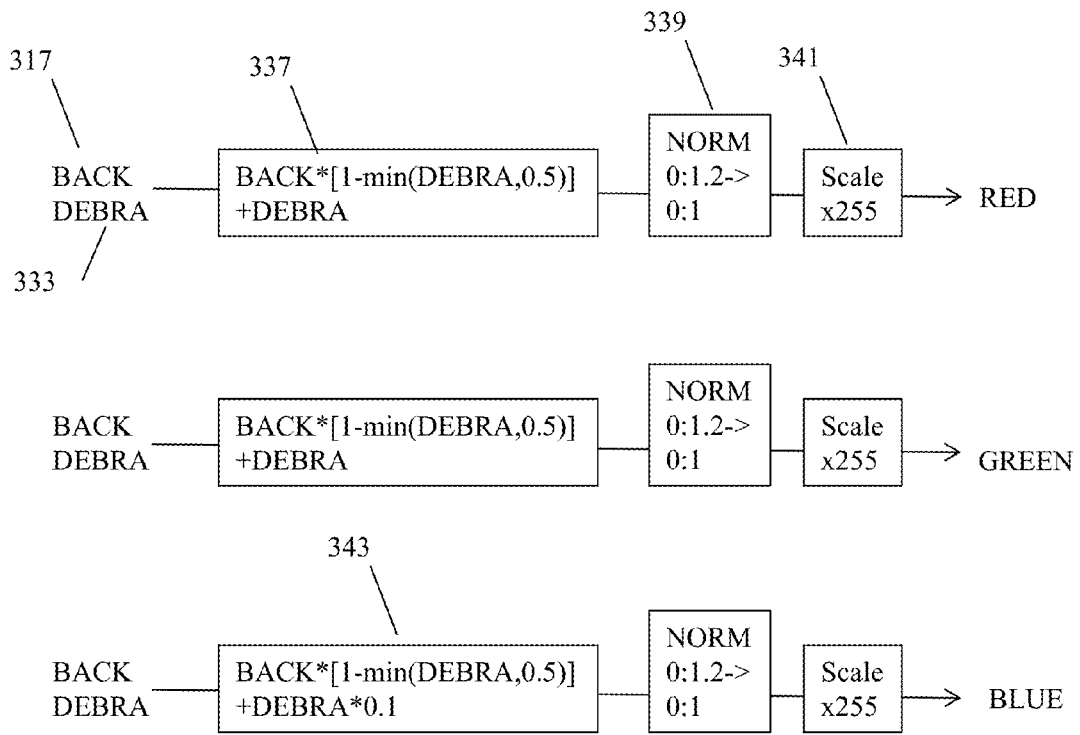

Referring now to FIGS. 5A-5C, the system and method of the present embodiment blend more than one metric to determine atmospheric parameter probability. Referring now to FIG. 5A, the use of the specific wavelengths 301 and 307 is constrained by what is provided by the satellite; however, wavelengths 301 and 307 are known to represent dust. BTD1 303, BTD2 309, and BT3 313 are three independent measurement approaches for determining the presence of dust in the imagery. The present embodiment uses multiple metrics to increase the confidence of the detection of dust. BM1 305 and BM2 311 are "clear sky" background values for shown spectral differences which account for time of year and time of day. The present embodiment applies existing clear sky databases (e.g. Global Surface Temp MERRA and University of Wisconsin Baseline Fit (UWBF)) to create BM1 305 and BM2 311. BM1 305 and BM2 311 values can be determined objectively using existing clear sky databases. BT3 313 is a conventional measure that does not incorporate background, instead assumes that the higher an atmospheric parameter is located in the atmosphere, the cooler it should be. The atmospheric parameter could be, for example, but not limited to, dust or clouds. For BT3 313, the lower and upper norm values 315 are chosen by measured minimum and maximum values, clipped herein by the shown ranges. BACK 317 is a direct measurement: 11.2 μm infrared value is used for nighttime, and 0.6 μm visible value is used for daytime.

Referring now to FIG. 5B, BTD1 303 (FIG. 5A), BTD2 309 (FIG. 5A), and BT3 313 (FIG. 5A) are used to compute a daytime value 321 and a nighttime value 325 using equations 319 and 323 respectively. CM is a cloud mask computed by conventional means that is equal to zero for absence of the atmospheric parameter and one for presence of the atmospheric parameter. Solar zenith angle 327 is used to compute terminator weight 331 through inequalities 329. Equation 333 provides the measure of the probability of the atmospheric parameter (e.g. dust) based on the terminator weight, the daytime value of the atmospheric parameter, and the nighttime value of the atmospheric parameter.

Referring now to FIG. 5C, the computations of FIGS. 5A and 5B are used to calculate the red, green, and blue colors that result in an image enhancement that shows areas with high dust probability as intense yellow. BACK 317 is the measured, unenhanced image intensity (11.2 μm night, 0.6 μm day). DEBRA 333 is the index that indicates the confidence of the presence of dust. The three equations allow visualization of the confidence of dust by modifying the value of the measured background intensity. With this formulation, increasing confidence of the existence of dust is shown as brighter yellow.

The method of the present embodiment to enhance dust from remotely-sensed data can include, but is not limited to including, the steps of automatically computing, from the remotely-sensed data at a location, a first brightness temperature difference BTD1 between 12.3 μm and 11.2 μm measurements, normalizing the BTD1 between 0 and 1 based on a background measurement computed for the BTD1 as a base scaling value, and 4.0 as a top scaling value, automatically computing, from the remotely-sensed data at the current location, a second brightness temperature difference BTD2 between 8.5 μm and 11.2 μm measurements, and normalizing the BTD2 between 0 and 1 by using the background measurement computed for the BTD2 as a base scaling value, and a value of 0.5 as a second top scaling value. The method can further include the steps of automatically computing a third brightness temperature value BT3 using the 11.2 μm measurement, normalizing the BT3 between 0 and 1 based on (a) a lower scaling bound of between $-10°$ C. to $10°$ C., and (b) an upper scaling bound of between $40°$ C. and $60°$ C., automatically computing a daytime value D based on the maximum value between the scaled BTD1 and scaled BTD2, and the scaled BT3, automatically computing a nighttime value N based on the scaled BTD2 and the scaled BT3. The method can still further include the steps of automatically computing a terminator weighting function T based on the solar zenith angle for the location, the solar zenith angle being $0°$ when the sun is directly overhead, the solar zenith angle being $90°$ when the sun is on the horizon, automatically computing an enhancement variable based on T, D, and N, and enhancing imagery based on the enhancement variable.

Optionally, the method can include the steps of automatically computing a cloud mask CM based on spatial and spectral threshold tests by conventional, the CM being 0 for clear sky, 1 for cloudy, and between 0 and 1 based on confidence factors, automatically filtering the remotely-sensed data based on the CM, automatically modifying the D based on the CM, automatically modifying the N based on the CM, automatically modifying the enhancement variable based on the modified D, the modified N, and T, and enhancing imagery based on the modified enhancement variable. The method can further optionally include the steps of automatically computing the D=[2*the maximum value of (scaled BTD1 and scaled BTD2)+scaled BT3]*(1−CM), automatically computing the N=[2.0*scaled BTD2+0.5*scaled BT3]*(1−CM), automatically computing the T, wherein if cos(solar zenith angle) >0.383, T=1, if cos(solar zenith angle)<0, T=0, and otherwise T=(cos(solar zenith angle)/0.383)/1.5, the solar zenith angle being defined at each location in a scene, the solar zenith angle=$0°$ when the sun is directly overhead, the solar zenith angle=$90°$ when the sun is on the horizon, and automatically computing Dynamic Enhancement: Background-Reduction Algorithm (DEBRA)=T*D+(1.0−T)*N. The method can still further optionally include the steps of automatically computing a BACK based on the 11.2 µm measurement, normalizing the BACK between 0 and 1 based on the largest and smallest values in the scene, the coldest value is scaled to 1, the warmest value is scaled to 0, the remaining values being between 0 and 1, automatically computing RED=BACK*(1−min(DEBRA,0.5))+DEBRA, normalizing the RED between 0 and 1 based on a lower bound of 0 and an upper bound of 1.2, and the normalized RED being multiplied by 255 to produce a scaled RED, automatically computing GREEN=BACK*(1−min(DEBRA,0.5))+DEBRA, normalizing the GREEN between 0 and 1 based on a lower bound of 0 and an upper bound of 1.2, and the normalized GREEN being multiplied by 255 to produce a scaled GREEN, automatically computing BLUE=BACK*(1−min(DEBRA,0.5))+0.1*DEBRA, normalizing the BLUE between 0 and 1 based on a lower bound of 0 and an upper bound of 1.2, and the normalized BLUE being multiplied by 255 to produce a scaled BLUE, and automatically creating a dust-enhanced image by combining the scaled RED, the scaled GREEN, and the scaled BLUE in a composite image. The scaling bounds in the above description are specific to an infrared emission band, but can be generalized to an arbitrary background variable.

Figure 6:
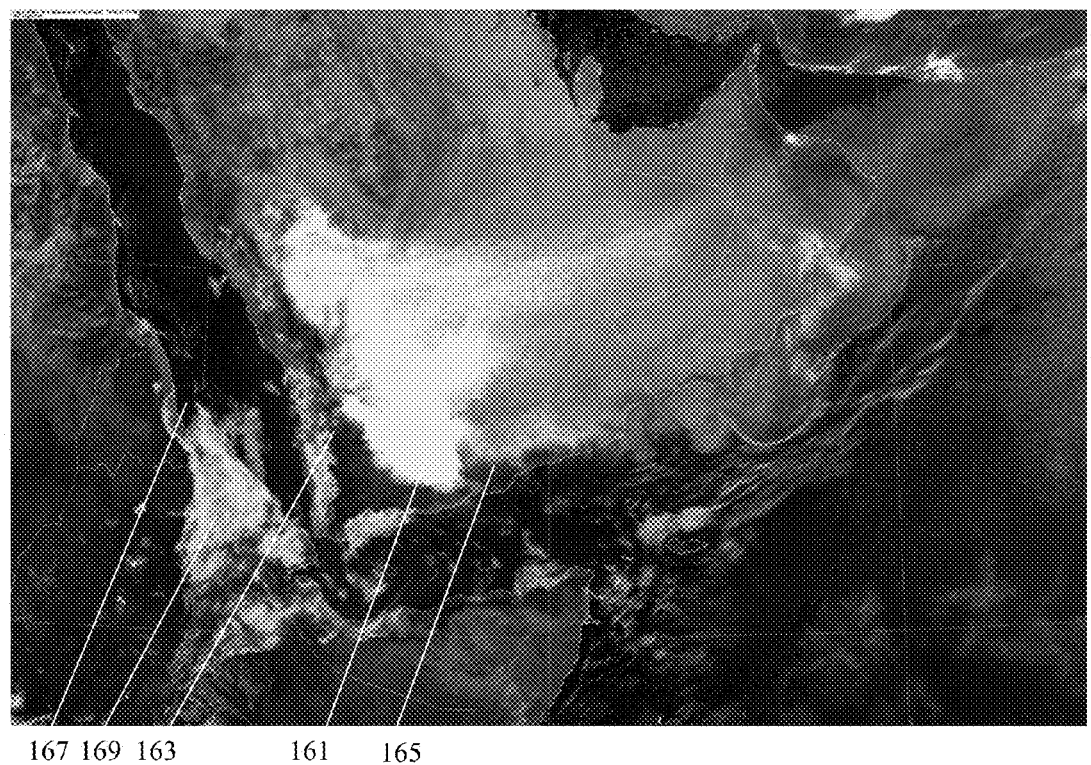
FIGS. 6-10 are images of dust that is enhanced according to the methods and systems of the present embodiment.

Referring now to FIG. 6, shown is an enhanced atmospheric parameter, in this case dust 161, in this case enhanced in yellow, over Saudi Arabia 163 and Yemen 165. Dust 161 is enhanced according to the systems and methods of the present embodiments. In FIG. 6, the Red Sea 167 is shown to be relatively free from dust. Note that for FIGS. 6-10, the brighter the yellow, the higher the confidence that the atmospheric parameter that is enhanced is actually, in this example, dust. Clouds 169 can be seen over Eritrea and Ethopia. Dust is discerned from other factors, for example, clouds, by its spectral signature.

Figure 7:
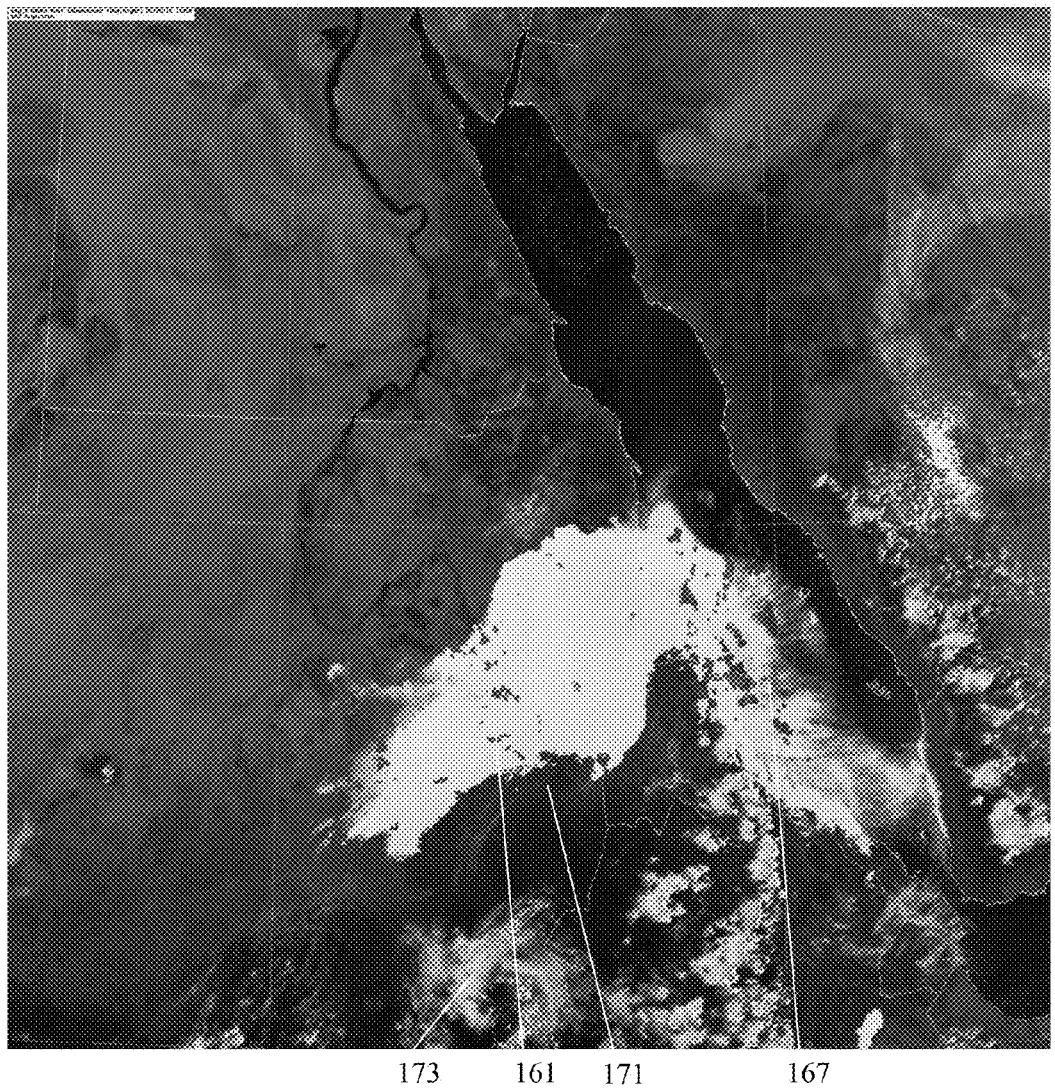

Referring now to FIG. 7, dust 161 can be seen over the Sudan 171 and blowing over the Red Sea 167. Circulation 173 can be seen over the southern part of the Sudan 171 and Ethiopia. This cyclonic cloud pattern could be indicative of a possible surface low pressure system that may have played a role in dust 161 lofting to the north.

Figure 8:
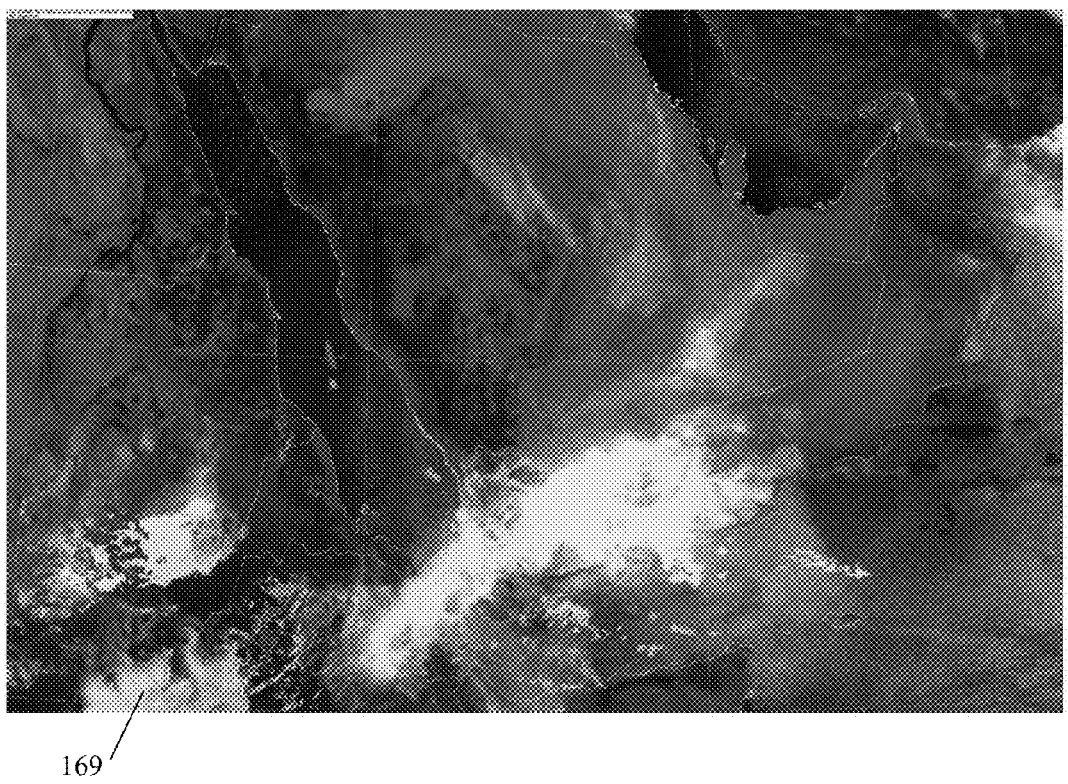

Referring now to FIG. 8, upper-level clouds 169 obscure the detection of dust below them over Africa.

Figure 9:
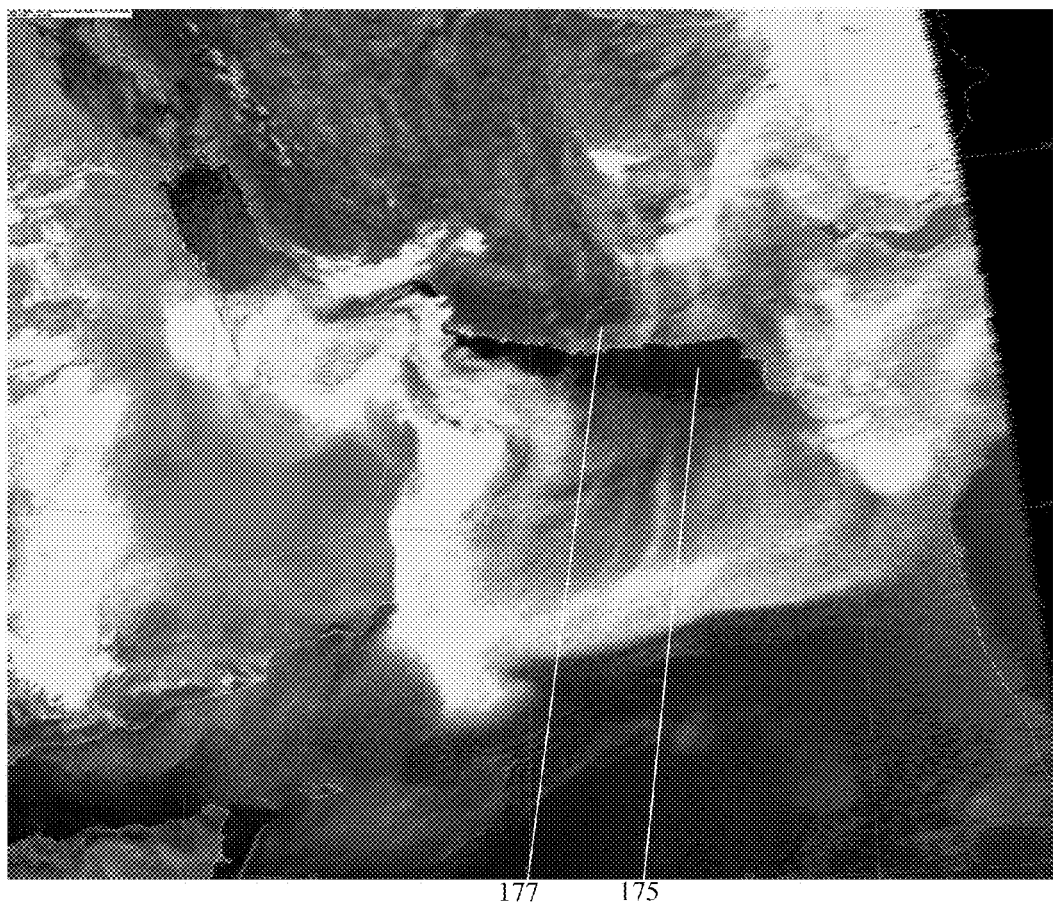

Referring now to FIG. 9, the apparently dust-free air 175 along the coast of Pakistan/Iran 177 likely contains low-level dust that the algorithm tests are not sensitive enough to see with the current scaling. This is not a limitation of the present embodiment but of the specific tests being applied during a specific dust detection implementation. Further tests could provide better detection performance.

Figure 10:
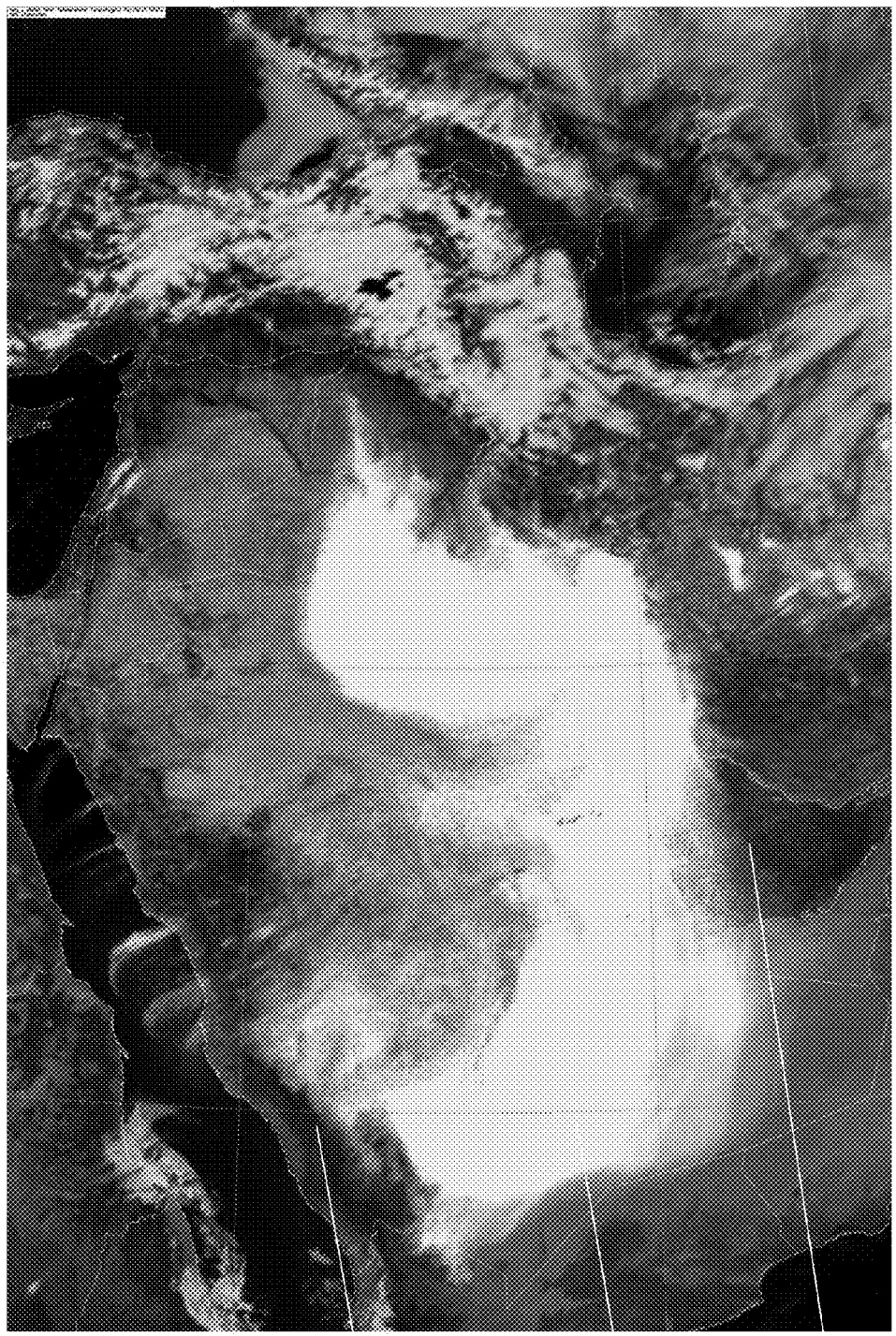

Referring now to FIG. 10, a large expanse of dust 161 is shown over Saudi Arabia 163 and the Persian Gulf 179.

Referring again to FIGS. 1 and 3, raw data and results from the computations of the systems and methods of the present embodiments can be stored for future retrieval and processing, printed, displayed, transferred to another computer, and/or transferred elsewhere. Background data 117 (FIGS. 1 and 3) can arrive and depart systems 100 (FIG. 1) and 200 (FIG. 3) through electronic communications 103 (FIGS. 1 and 3). Electronic communications 103 (FIGS. 1 and 3) can be wired or wireless, for example, using cellular communication systems, military communications systems, and satellite communications systems. Any software required to implement the system can be written in a variety of conventional programming languages. Systems 100 (FIG. 1) and 200 (FIG. 3), including any possible software, firmware, and hardware, can operate on a computer having a variable number of CPUs. Other alternative computer platforms can be used. The operating system can be, for example, but is not limited to, WINDOWS® or LINUX®.

Referring again primarily to FIGS. 2 and 4, methods 150 (FIG. 2) and 250 (FIG. 4) can be, in whole or in part, implemented electronically. Signals representing actions taken by elements of systems 100 (FIG. 1) and 200 (FIG. 3) and other disclosed embodiments can travel over at least one live communications network 103 (FIGS. 1 and 3). Control and data information can be electronically executed and stored on at least one computer-readable medium such as, for example, enhanced data database 131 (FIG. 1). System 100 (FIG. 1) and system 200 (FIG. 3) can be implemented to execute on at least one computer node 101 (FIGS. 1 and 3) in at least one live communications network 103 (FIGS. 1 and 3). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer-based method for enhancing at least one atmospheric parameter of interest provided in remotely-sensed data by detecting and suppressing false alarm data comprising:

automatically receiving measurement data for the atmospheric parameter of interest in a scene, the measurement data including false alarm data;

automatically compiling, from a number of observations, background data at each location in the scene, the background data including the false alarm data;

automatically selecting the measurement data to enhance, the selected measurement data each having a value greater than the value of the background data corresponding to the measurement data at each of the locations;

automatically enhancing the selected measurement data at each of the locations by scaling the measurement data, the scaling bounds being dynamically defined based on the locations and the background data corresponding to each of the locations;

automatically computing a first normalized brightness temperature difference, a second normalized brightness temperature difference, and a third normalized brightness temperature value based on the measurement data;

automatically computing a daytime value D based on the maximum value of one of the first normalized brightness temperature difference, the second normalized brightness temperature difference, and the third normalized brightness temperature value;

automatically normalizing the D;

automatically computing a nighttime value N based on the second normalized brightness temperature difference and the third normalized brightness temperature value;
automatically normalizing the N;
automatically computing a terminator weighting function T based on the solar zenith angle for a current location;
automatically computing an enhancement variable based on T, D, and N; and
automatically enhancing imagery based on the enhancement variable.

2. The method as in claim 1 further comprising:
presenting the enhanced measurement data as the enhanced imagery.

3. The method as in claim 1 further comprising:
providing the enhanced measurement data as digital data; and
determining a quantitative confidence measure of the enhanced measurement data at each of the locations based on the digital values of the enhanced measurement data at each of the locations.

4. A computer-implemented method for creating enhanced imagery derived from remotely-sensed data for at least one atmospheric parameter comprising:
automatically conducting multiple detection tests of the remotely-sensed data for the at least one atmospheric parameter, each of the tests having a spatially resolved background value, each of the tests having a result;
automatically computing the strength of contribution of each of the tests based on the background value corresponding to each of the tests and the results;
automatically weighting the results based on the strengths;
automatically creating enhanced imagery for the at least one atmospheric parameter based on the combined weighted results;
automatically computing, from the remotely-sensed data at a location, a first brightness temperature difference BTD1;
automatically normalizing the BTD1;
automatically computing, from the remotely-sensed data at a current location, a second brightness temperature difference BTD2;
automatically normalizing the BTD2;
automatically computing a third brightness temperature value BT3;
automatically normalizing the BT3;
automatically computing a daytime value D based on the maximum value of one of the normalized BTD1 and normalized BTD2, and the normalized BT3;
automatically normalizing the D;
automatically computing a nighttime value N based on the normalized BTD2 and the normalized BT3;
automatically normalizing the N;
automatically computing a terminator weighting function T based on the solar zenith angle for the current location;
automatically computing an enhancement variable based on T, D, and N; and
automatically enhancing imagery based on the enhancement variable.

5. The method as in claim 4 further comprising:
filtering clouds from the remotely-sensed data before automatically conducting multiple detection tests of the remotely-sensed data.

6. The method as in claim 4 further comprising:
automatically computing a cloud mask CM based on spatial and spectral threshold tests;
automatically filtering the remotely-sensed data based on the CM;
automatically modifying the D based on the CM;
automatically modifying the N based on the CM;
automatically modifying the enhancement variable based on the modified D, the modified N, and T; and
automatically enhancing imagery based on the modified enhancement variable.

7. The method as in claim 6 further comprising:
automatically computing the D=[2*the maximum value of (normalized BTD1 and normalized BTD2)+scaled BT3]*(1−CM);
automatically computing the N=[2.0*normalized BTD2+ 0.5*normalized BT3]*(1−CM);
automatically computing the T, wherein if cos (solar zenith angle)>0.383, T=1, if cos (solar zenith angle)<0, T=0, and otherwise T=(cos(solar zenith angle)/0.383)/1.5, the solar zenith angle being defined at each location in a scene, the solar zenith angle=0° when the sun is directly overhead, the solar zenith angle=90° when the sun is on the horizon; and
automatically computing DEBRA=T*D+(1.0−T)*N.

8. The method as in claim 4 further comprising:
automatically computing BACK based on a pre-selected wavelength;
normalizing the BACK;
automatically computing RED=BACK*(1−min(DEBRA, 0.5))+DEBRA;
normalizing the RED;
automatically computing GREEN=BACK*(1−min(DEBRA,0.5))+DEBRA;
normalizing the GREEN;
automatically computing BLUE=BACK*(1−min(DEBRA,0.5))+0.1*DEBRA;
normalizing the BLUE; and
automatically creating a dust-enhanced image by combining the normalized RED, the normalized GREEN, and the normalized BLUE in a composite image.

9. A computer-based system for enhancing at least one atmospheric parameter of interest provided in remotely-sensed data by detecting and suppressing false alarm data comprising:
a receiver automatically receiving measurement data for the atmospheric parameter of interest in a scene, the measurement data including false alarm data;
a background data processor automatically compiling, from a number of observations, background data at each location in the scene, the background data including the false alarm data;
a data selector automatically selecting the measurement data to enhance, the selected measurement data each having a value greater than the value of the background data corresponding to the measurement data at each of the locations; and
an atmospheric parameter enhancer automatically enhancing the selected measurement data at each of the locations by scaling the measurement data, the scaling bounds being dynamically defined based on the locations and the background data corresponding to each of the locations, wherein the atmospheric parameter enhancer further comprises computer code instructions configured to:
automatically compute, from the remotely-sensed data at a location, a first brightness temperature difference BTD1 between 12.3 µm and 11.2 µm measurements;
automatically normalize the BTD1 between 0 and 1 based on a background measurement computed for the BTD1 as a base scaling value, and 4.0 as a top scaling value;

automatically compute, from the remotely-sensed data at the current location, a second brightness temperature difference BTD2 between 8.5 μm and 11.2 μm measurements;

automatically normalize the BTD2 between 0 and 1 by using the background measurement computed for the BTD2 as a base scaling value, and a value of 0.5 as a second top scaling value;

automatically compute a third brightness temperature value BT3 using the 11.2 μm measurement;

automatically normalize the BT3 between 0 and 1 based on (a) a lower scaling bound of between −10° to 10° C., and (b) an upper scaling bound of between 40° and 60° C.;

automatically compute a daytime value D based on the maximum value of one of the scaled BTD1 and scaled BTD2, and the scaled BT3;

automatically normalize the D between 0 and 1 based on (a) a lower scaling bound of 0.5 and (b) an upper scaling bound of 2.5;

automatically compute a nighttime value N based on the scaled BTD2 and the scaled BT3;

automatically normalize the N between 0 and 1 based on (a) a lower scaling bound of 0.5 and (b) an upper scaling bound of 2.5;

automatically compute a terminator weighting function T based on the solar zenith angle for the location, the solar zenith angle being 0° when the sun is directly overhead, the solar zenith angle being 90° when the sun is on the horizon;

automatically compute an enhancement variable based on T, D, and N; and automatically enhance imagery based on the enhancement variable.

10. The system as in claim 9 wherein the atmospheric parameter enhancer further comprises:

computer code instructions configured to:

automatically compute a cloud mask CM based on spatial and spectral threshold tests, the CM being 0 for clear sky, 1 for cloudy, and between 0 and 1 based on confidence factors;

automatically filter the remotely-sensed data based on the CM;

automatically modify the D based on the CM;

automatically modify the N based on the CM;

automatically modify the enhancement variable based on the modified D, the modified N, and T; and automatically enhance imagery based on the modified enhancement variable.

11. The system as in claim 9 wherein the atmospheric parameter enhancer further comprises:

computer code instructions configured to:

automatically compute the D=[2*the maximum value of (scaled BTD1 and scaled BTD2)+scaled BT3]*(1−CM);

automatically compute the N=[2.0*scaled BTD2+0.5*scaled BT3]*(1−CM);

automatically compute the T, wherein if cos (solar zenith angle)>0.383, T=1, if cos (solar zenith angle)<0, T=0, and otherwise T=(cos(solar zenith angle)/0.383)/1.5, the solar zenith angle being defined at each location in a scene, the solar zenith angle=0° when the sun is directly overhead, the solar zenith angle=90° when the sun is on the horizon; and automatically compute DEBRA=T*D+(1.0−T)*N.

12. The system as in claim 9 wherein the atmospheric parameter enhancer further comprises:

computer code instructions configured to:

automatically compute BACK based on the 11.2 μm measurement;

automatically normalize the BACK between 0 and 1 based on the largest and smallest values in the scene, the coldest value is scaled to 1, the warmest value is scaled to 0, the remaining values being between 0 and 1;

automatically compute RED=BACK*(1−min(DEBRA, 0.5))+DEBRA;

automatically normalize the RED between 0 and 1 based on a lower bound of 0 and an upper bound of 1.2, and the normalized RED being multiplied by 255 to produce a scaled RED;

automatically compute GREEN=BACK*(1−min(DEBRA,0.5))+DEBRA;

automatically normalize the GREEN between 0 and 1 based on a lower bound of 0 and an upper bound of 1.2, and the normalized GREEN being multiplied by 255 to produce a scaled GREEN;

automatically compute BLUE=BACK*(1−min(DEBRA,0.5))+0.1*DEBRA;

automatically normalize the BLUE between 0 and 1 based on a lower bound of 0 and an upper bound of 1.2, and the normalized BLUE being multiplied by 255 to produce a scaled BLUE; and automatically create a dust-enhanced image by combining the scaled RED, the scaled GREEN, and the scaled BLUE in a composite image.

13. The system as in claim 9 wherein the atmospheric parameter enhancer further comprises:

computer code instructions configured to present the enhanced measurement data as imagery;

provide the enhanced measurement data as digital data; and determine a quantitative confidence measure of the enhanced measurement data at each of the locations based on the digital values of the enhanced measurement data at each of the locations.

* * * * *